United States Patent [19]

Weischedel

[11] 4,258,308

[45] Mar. 24, 1981

[54] SWITCHING REGULATOR WITH FLYBACK CONTROL OFFSET

[75] Inventor: Richard C. Weischedel, Camillus, N.Y.

[73] Assignee: General Electric Company, Syracuse, N.Y.

[21] Appl. No.: 28,508

[22] Filed: Apr. 9, 1979

[51] Int. Cl.³ .............................................. G05F 1/56
[52] U.S. Cl. ..................................... 323/285; 363/44
[58] Field of Search ........... 323/20, 17, 22 T, DIG. 1; 363/21, 44, 125, 126

[56] References Cited

U.S. PATENT DOCUMENTS

| | | | |
|---|---|---|---|
| 1,964,521 | 6/1934 | Kubler | 363/44 |
| 3,566,253 | 2/1971 | O'Neill | 323/22 |
| 3,577,065 | 5/1971 | Putzrath et al. | 323/22 |
| 3,736,495 | 5/1973 | Calkin et al. | 323/17 |
| 3,745,444 | 7/1973 | Calkin et al. | 323/17 |
| 3,931,566 | 1/1976 | Pask et al. | 323/17 X |
| 3,982,174 | 9/1976 | Maddox | 323/17 |
| 4,028,612 | 6/1977 | Orlando | 323/17 |

*Primary Examiner*—William M. Shoop
*Assistant Examiner*—Peter S. Wong
*Attorney, Agent, or Firm*—Carl W. Baker; Richard V. Lang

[57] ABSTRACT

A switching regulator having a solid state switch which turns on and off as needed to maintain output regulation, a choke which tries to maintain constant current flow, a voltage and current comparator which controls the solid state switch, and a flyback diode in series with an offset voltage which provides a current flow path for the choke when the solid state switch becomes non-conducting. The offset voltage results in a lower voltage across the diode and solid state switch when they are non-conducting. The offset control provides higher efficiencies with the most improvement at ultrasonic frequencies and higher voltages. Radio frequency interference is also significantly reduced.

6 Claims, No Drawings

SWITCHING REGULATOR WITH FLYBACK CONTROL OFFSET

BACKGROUND OF THE INVENTION

This invention relates to a switching type regulator which provides a regulated power supply.

Switching regulators maintain a substantially constant voltage and/or current to the load by periodically interrupting the power supplied by the unregulated source and by using a choke which attempts to maintain continuous output current. A flyback or commutating diode clamps the choke input to ground to maintain continuous output current when the switch interrupts the power supplied to the regulating circuit. As voltage levels and switching frequencies increase the switching losses increase substantially, limiting the output capacity of the voltage regulator at high operating frequencies.

When the switch is conducting, power is delivered to the circuit. When the switch is not conducting there is no power delivered to the circuit by the unregulated input voltage. This results in a block of power followed by no power input. This severe fluctuation of input power and therefore current during the switching cycle results in conducted noise on the return line which is used for a reference point for most filtering.

It is an object of the present invention to provide a switching regulator that is operable at ultrasonic frequencies (above 20,000 Hz) with significantly reduced switching losses.

Another object of the present invention is to provide a switching regulator with reduced radio frequency interference.

Still another object of the present invention is to provide a switching regulator with higher efficiency and an increased output capacity.

SUMMARY OF THE INVENTION

One form of the present invention comprises a switching regulator having a solid state switch, a choke and a capacitor connected across a pair of input terminals. There is a pair of output terminals connected across the capacitor. The switching regulator further includes a flyback diode poled to conduct when the solid state switch is in the non-conducting state. One side of the flyback diode is connected between the choke and the solid state switch, and the other side is connected to one terminal of a pair of offset voltage terminals. One terminal of each of the input, output, and offset voltage terminals are connected together to form a return line. The offset voltage is less than the desired regulated output voltage which, in turn, is less than the unregulated input voltage. A voltage regulator monitors the output voltage and controls the solid state switch. When the solid state switch is conducting, current builds in the choke until the output voltage rises above a set value, whereupon the voltage comparator causes the solid state switch to become non-conductive. The choke current decays as it tries to maintain the current flow through a current path provided by the flyback diode and offset voltage source. When the output voltage drops below a second set value, the voltage comparator causes the solid state switch to become conductive. The flyback diode is then back biased and the current through the choke builds and the cycle is repeated.

The offset voltage results in lower voltages across the diode and the solid state switch when they are non-conducting. Higher efficiencies are achieved with the switch regulator with offset voltage because of reduced switching losses. The greatest improvement occurs at ultrasonic frequencies (above 20,000 Hz) and higher voltages (above 15 volts). Radio frequency interference is also decreased at all frequencies and voltages because power is continuously taken from the power source when a single power source supplies both input and offset voltages.

Switching losses in the switching voltage regulator can be further reduced by the use of Schottky diodes and faster transistors in applications where the unregulated input voltage was previously too high to permit their use.

When a Schottky diode or a very fast recovery diode is used, the recovery time of the flyback diode is negligible. Therefore, it is not necessary to limit the current in the solid state switch until the flyback diode has recovered to prevent surges.

BRIEF DESCRIPTION OF THE DRAWING

While the specification concludes with claims particularly pointing out and distinctly claiming the present invention, the object and advantages of the invention can be more readily ascertained from the following description of a preferred embodiment when read in conjunction with the accompanying drawing in which:

DESCRIPTION OF THE INVENTION

Figure 1:
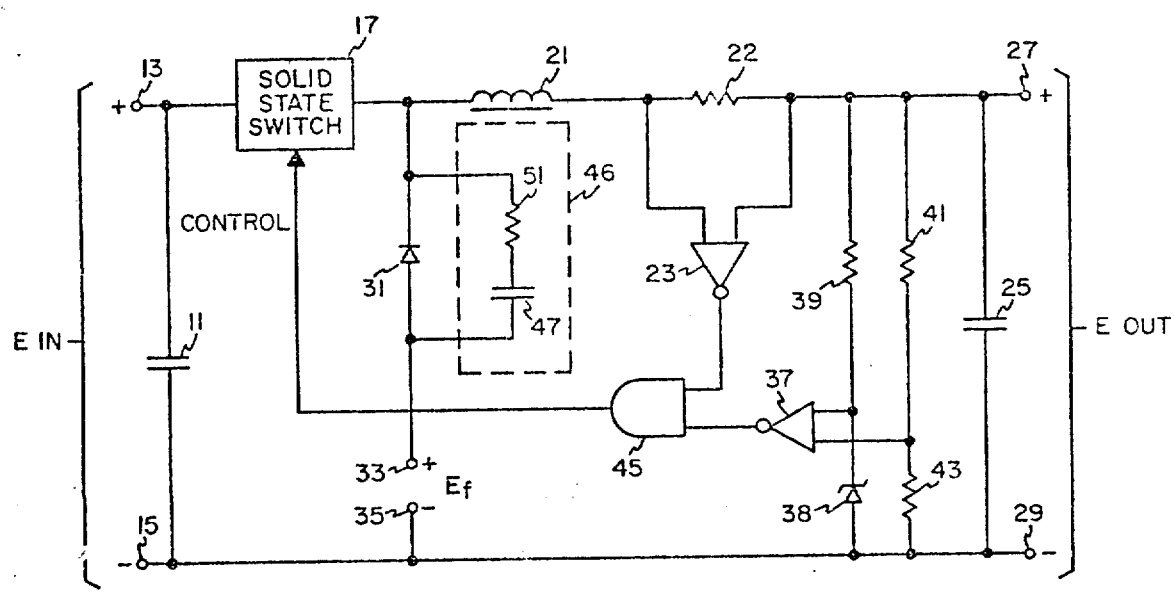
FIG. 1 is a schematic diagram partially in block form of the switching regulator with offset flyback control.

Referring to FIG. 1 in which an embodiment of the switching regulator is shown, there is included in the illustrated circuit a capacitor 11 across a pair of input terminals 13 and 15. Connected in series across the capacitor 11 are a solid state switch 17, choke 21, current sensing resistor 22 of current comparator 23, and capacitor 25. An output terminal pair 27 and 29 are connected across capacitor 25, with terminal 27 connected to one side of the current sensing resistor 22 of current comparator 23. The cathode of flyback diode 31 is connected between solid state switch 17 and choke 21; and the anode of flyback diode 31 is connected to one of the pair of offset voltage terminals 33. The other offset voltage terminal 35 is connected to one of the input terminals 15 as well as being connected to one of the output terminals 29.

A voltage comparator 37 has one input from a voltage reference, such as constituted by a Zener diode 38 and series resistor 39, and the other input from a voltage divider made up of resistors 41 and 43 which are connected across the output terminals 27 and 29. The output of the voltage comparator 37 and the output of the current comparator 23 each make up an input to AND gate 45. Both inputs are high only when the load voltage and the load current are both below their regulated values. The output of the AND gate 45 controls the solid state switch 17. A snubber circuit 46 consisting of a capacitor 47 in series with a resistor 51 is connected across diode 31 to protect the diode and to reduce radio frequency interference.

The input voltage to be regulated ($E_{in}$) is connected across the input terminal path 13 and 15. An offset voltage $E_f$ is connected across offset terminal 33 and 35, and the load can be connected across output terminal pair 27 and 29. $E_{in}$ is greater than $E_{out}$ which in turn is greater than $E_f$.

If it is assumed for purposes of explanation that the switching regulator with offset flyback control is operating, that the solid state switch 17 is in the non-conducting state and that there is a load current and an output voltage within the normal operating range supplied to a load connected across the terminals 27 and 29, then as the choke current becomes less than the load current supplied to the load, the capacitor 25 is discharged lowering the voltage supplied to the load. When the choke current and the output voltage are both below the setting of their respective comparators 23 and 37, both comparators 23 and 37 will provide a signal to enable AND gate 45 and thereby cause solid state switch 17 to become conductive. Just before the solid state switch 17 turns on it has a voltage of $E_{in}-(E_f-$ diode drop) across it. When the switch is conductive, it provides a voltage of $E_{in}$ minus the voltage drop across the switch 17 at the input of choke 21, which back biases flyback diode 31. The current in choke 21 then increases because the input voltage $E_{in}$ is greater than the output voltage $E_{out}$. As the choke current increases beyond the load current, the output voltage increases as capacitor 25 is charged. When either the output voltage reaches above the voltage comparator 37 setting, or the output current reaches above the current comparator 23 setting, or both, the AND gate 45 will be disabled and the solid state switch 17 will become non-conductive.

The choke 21 with its stored energy will try to maintain constant current flow and the input side of the choke will go negative as the field around the choke collapses, until the flyback diode 31 conducts clamping the choke input one diode drop below the offset voltage ($E_f$). The capacitor 47 in the snubber circuit 46 discharges when the flyback diode 31 conducts.

The current in the choke 21 will decay until it is less than the output load current, at which time the voltage will drop across capacitor 25. When both the load current and the output voltage are less than the setting of the current comparator 23 and the voltage comparator 37, respectively, the switching cycle will begin again.

Figure 2:
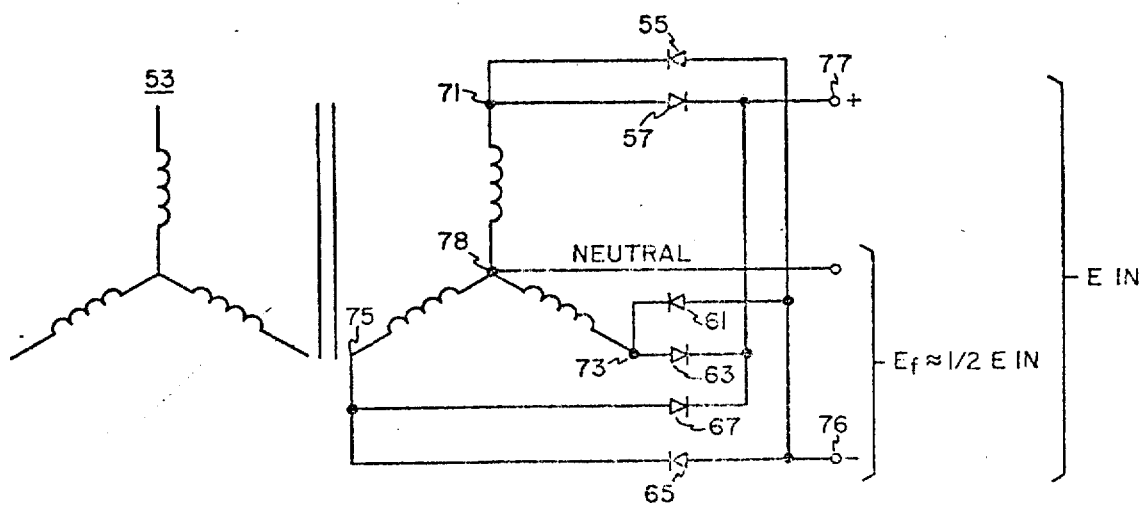
FIG. 2 is a schematic diagram of a source of input voltage and offset control.

FIG. 2 shows one way in which the input voltage $E_{in}$ and offset voltage $E_f$ can be obtained. A three-phase transformer 53 with a secondary in a wye configuration has six diodes 55, 57, 61, 63, 75 and 67 forming a three-phase bridge, connected to the three different phases 71, 73, and 75 of the transformer secondary. Diodes 55, 61 and 65 each has its cathode connected to phase 71, 73 and 75, respectively. Diodes 57, 63 and 67 each has its anode connected to phase 71, 73 and 75, respectively. The anodes of diodes 55, 61 and 65 are connected together to form a bridge output terminal 76. The cathodes of diodes 57, 63 and 67 are connected together to form an output bridge terminal 77.

The $E_{in}$ voltage can be obtained by connecting bridge output terminal 77 to input terminal 13 of FIG. 1 and by connecting bridge output terminal 76 to input terminal 15 of FIG. 1. The offset voltage can be obtained by connecting the neutral 78 of the secondary transformer 53 to offset voltage terminal 33 of FIG. 1.

When using the output of the bridge circuit for the input voltage of FIG. 1 and the neutral for the offset voltage it is necessary to satisfy the requirement that $E_{in}$ is greater than $E_{out}$ which in turn is greater than $E_f$. Under these conditions there will be some ripple in the direct current voltage obtained from the bridge circuit. The $E_{in}$ voltage minus the ripple voltage and circuit IR drops must always exceed the required output voltage $E_{out}$. The voltage $E_f$ plus the peak ripple minus circuit IR drops must not exceed the required output voltage. If these conditions are not met the output regulation will be lost. When the input voltage is too small, it will not be possible to obtain the desired output voltage. When the offset voltage is too great the output capacitor 25 will be charged to a value greater than the desired regulated output and since the solid state switch 17 is in the non-conducting mode when flyback diode 31 is conducting, the voltage comparator 37 will not be able to prevent this overcharging. Averaging filters could be used to eliminate ripple voltages from the three-phase bridge.

Referring again to FIG. 1, as the solid state switch 17 traverses the active region, as it goes from the non-conducting to the conducting state, it must assume the current through diode 31 and snubber circuit 46 which is typically over 90% of the output current. When the solid state switch 17 goes from the conductive state to the non-conductive state the active region is traversed once again and the choke current is carried by the solid state switch 17 and the snubber circuit 46 until the flyback diode 31 conducts. Power losses are high as the active region is traversed.

The main losses in a switching regulator consists of a voltage drop across solid state switch 17 and the flyback diode 31, plus switching losses and snubber 46 losses while traversing the active region when the solid state switch 17 goes back and forth between the conducting and non-conducting states. At a fixed load current the voltage drop losses are fixed and are normally independent of voltage and frequency. The switching losses and snubber circuit losses vary with both frequency and voltage. The switching losses can be illustrated by the following equation:

$$\text{Switching losses} \simeq \left( \frac{E_{in}I_{out}t_{ON}}{2} + \frac{E_{in}I_{out}t_{OFF}}{2} \right) \times f, \text{ or } \frac{E_{in}I_{out}}{2} (t_{ON} + t_{OFF}) \times f$$

where
$E_{in}$ = input voltage or operating voltage across solid state switch and flyback diode.
$I_{out}$ = output load current.
$t_{ON}$ = turn ON time of solid state switch.
$t_{OFF}$ = turn OFF time of solid state switch.
f = frequency of switching.

In a conventional switching regulator without offset flyback control the unregulated DC input voltage becomes the operating voltage across the solid state switch and flyback diode when they are not conducting. When the solid state switch is conducting, the voltage across the back-biased diode is the input voltage less the voltage drop across the switch. When the solid state switch goes from the conductive to the non-conductive state, the voltage across the solid state switch is the input voltage because as the diode conducts, one side of the solid state switch is clamped to ground. The snubber circuit 46 losses vary directly with frequency and the voltage squared. The snubber losses are:

$$\text{snubber loss} = \tfrac{1}{2} C\, E_{in}^2 \times f.$$

where C is snubber capacitance.

As an example of switching snubber losses in a circuit without offset flyback control, assume there is a switching regulator with a 28 volt output voltage and a 40 ampere output current with the input voltage equal to 45±15 volts and a solid state switch that has turn on and turn off times of 0.5 μfd capacitor which is charged and discharged each cycle.

The switching losses at 3 KHz would be approximately $$\frac{45 \times 40}{2} (0.5 + 0.5) \times 10^{-6} \times 3K$$

or 2.7 watts. The snubber losses are approximately 0.6 watts.

The switching losses and snubber losses at 40 KHz would be approximately 36 and 8 watts, respectively. The forward drop losses are approximately 1 volt at 40A, or 40 watts (assuming flyback diode and solid state switch each have 1 volt drop). Hence, the switching losses become relatively substantial, limiting the output capacity and/or operating frequency and volumetric efficiency of the package.

The switching losses can be reduced significantly by connecting the flyback diode to an offset voltage just below the output level. In the above example assume $E_f$ of 27 volts. The operating voltage across the flyback diode and the solid state switch becomes 18 volts nominal and 33 volts maximum. The lower voltage across the flyback diode and solid state switch allows the use of lower voltage transistors with faster switching speeds. The switching losses at 40 KHz with faster transistors could be $$\frac{18 \times 40}{2} (0.3 \mu s) \times 40 \text{ KHz or } 8.64 \text{ watts.}$$

Snubber losses are reduced to less than 2 watts.

As frequency and voltage increase, the offset voltage control becomes even more important. Schottky diodes, which are otherwise attractive for the flyback diode application, are presently limited in voltage to less than 50 volts. However, with flyback control, the voltage across the flyback diode is reduced by the amount of the flyback voltage, enabling Schottky diodes to be used in higher voltage switching regulators. The Schottky diodes have 0.6 volt forward drops compared to over 1 volt drops of conventional diodes. The use of Schottky diodes or other very fast recovery time diodes also reduces surge currents and may avoid surge limiting means otherwise necessary.

The duty cycle of ON time vs. OFF time varies with flyback offset voltages, $E_f$. As the offset voltage increases, the OFF time grows larger than the ON time.

Figure 3A:
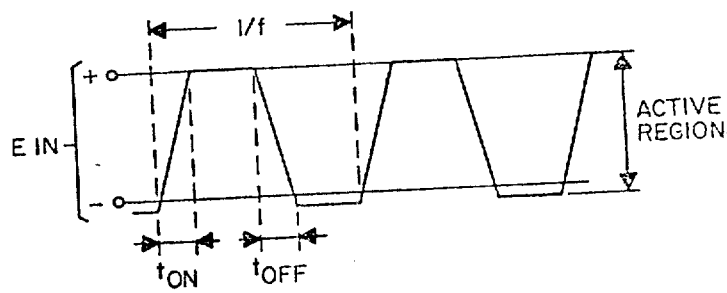
FIGS. 3a, b, c, d, e, f, g and h are waveform diagrams useful in explaining the operation of the switching voltage regulator with offset flyback control of FIG. 1.
Figure 3B:
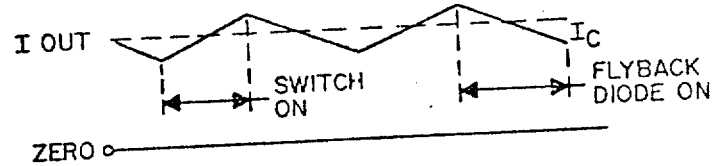
Figure 3C:
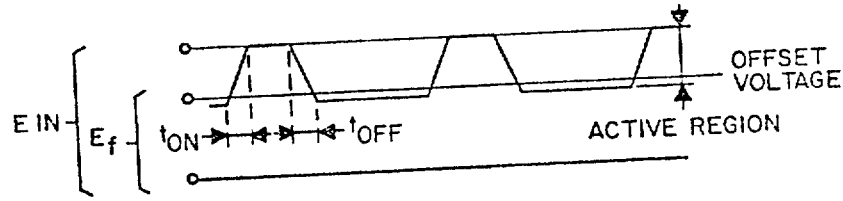
Figure 3D:
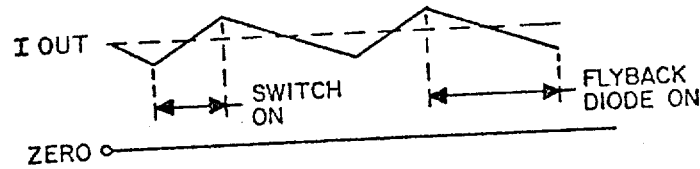

FIG. 3a shows an ON-OFF cycle of a circuit without flyback control. FIG. 3c shows an ON-OFF cycle of the circuit using flyback control. In all the waveforms shown in FIG. 3, the turn on ($T_{ON}$) and turn off ($T_{OFF}$) times are for illustration purposes and not to scale. Normally, turn on and turn off times are held to a very small percent (less than 2%) of a switching cycle to keep losses low as the active region is traversed. The example given earlier illustrates this. If the turn on and turn off times were drawn to scale, they would approach vertical lines. When the flyback voltage is close to the output voltage, the current decay in the choke takes much longer, since the rate of current fall or rise in a choke varies as a function of the voltage difference between its input and output, and its inductance. With the offset flyback control the duration of the OFF part of the duty cycle increases providing a further reduction in the power dissipated in the solid state switch but the power dissipated in the flyback diode increases. However, the flyback diode is a lower cost device than the solid state switch and lower voltage drops are more readily obtained. Schottky diodes as mentioned previously can have forward voltage drops of 0.6 volts.

Another advantage of the switching regulator with offset flyback control is that a smaller choke is required to obtain the same operating frequency as is achieved without the offset flyback control. This is due to the fact that the OFF time of the solid state switch increases as compared to a solid state switch in a switching regulator without the offset voltage; lower inductance therefore is required to obtain the same operating frequency. The choke used in the circuit to generate the waveform of FIG. 3c and d is smaller than the choke used in the circuit to generate the waveform of FIG. 3a and b.

Figure 3E:
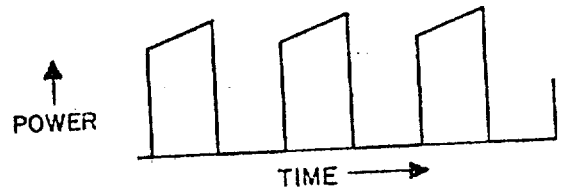
Figure 3F:
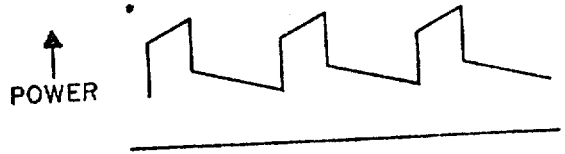
Figure 3G:
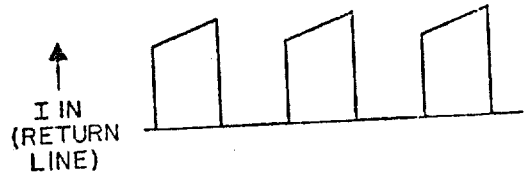
Figure 3H:

The EMI conducted noise is reduced significantly inasmuch as the input power and current fluctuations during a switching cycle are less severe with the offset flyback control. FIGS. 3e, f, g and h illustrate this. With the offset flyback control, power is constantly drawn from the unregulated power source, where the same unregulated power source supplies both the input and offset voltage. Without the offset flyback control, power is drawn in blocks with no power drawn between the blocks from the power source. The return line which is common to both the input and offset voltages is the reference point for most filtering since it is common to both input and output. The nearly constant current in this line minimizes inductive spikes and thus minimizes conducted noise.

The detailed description was made describing a time ratio control siwtching regulator, where the switching frequency varies with the load requirements. The offset flyback control would also work with a pulse width modulator control where the solid state switch is turned on repeatedly at a constant frequency and the load requirement determines how long the solid state switch stays on during a cycle.

The offset flyback control requires another voltage source. This can be obtained from transformer taps or the neutral wire of a three-phase transformer in those applications where AC power input is used. It is also possible for the offset voltage to be supplied from a source separate from the input voltage such as a battery. The input voltage and the offset voltage should have a common return line.

Although this invention has been described with reference to a specific embodiment thereof, the foregoing will suggest numerous modifications which are possible without departing from the invention. Accordingly, it is desired to cover all modifications within the spirit and scope of this invention.

What is claimed as new and desired to be secured by Letters Patent of the United States is:

1. A switching regulator for providing regulated power to a load, comprising:
   (a) a power source which includes means for providing power input to the regulator at first and second voltage levels with the first of the two voltage levels being higher than the voltage of the regulated power output to the load and the voltage of the regulated power of the load being greater than the second of the two voltage levels;

(b) means including a switch for connecting the higher voltage output of said unregulated power source to said load, said switch being operable in response to a control input to open and close the connection therethrough between the source and load;

(c) choke means interposed in the connection between said switch and said load for smoothing the load power;

(d) means for sensing a load power condition and for applying in response thereto a control input to said switch for operating the switch to hold the sensed load power condition at a regulated value thereof; and (e) means for supplying power to said load during periods when said switch is open comprising unidirectional current flow means connecting the lower voltage output of said unregulated power source to the point of connection of said switch and said choke means; whereby power is supplied to the load from the higher voltage output of said source through said switch when the switch is closed and is supplied from the lower voltage output of said source through said unidirectional current flow means when said switch is open.

2. A switching regulator as defined in claim 1, wherein said means for sensing a load power condition comprises means for sensing a load current condition and for applying in response thereto a control input to said switch for operating the switch to hold the sensed load current condition at a regulated value thereof.

3. A switching regulator as defined in claim 1, wherein said means for sensing a load power condition comprises means for sensing a load voltage condition and for applying in response thereto a control input to said switch for operating the switch to hold the sensed load voltage condition at a regulated value thereof.

4. A switching regulator comprising:

a pair of input terminals to accept the voltage to be regulated;

a pair of output terminals to which a load can be connected;

a pair of terminals to which an offset voltage, less than the predetermined regulated voltage desired across said output terminals, can be connected, one each of said input, output, and offset voltage terminals being connected together;

a choke;

a solid state switch interconnecting said other input terminal and said choke, said other end of said choke being connected to said other output terminal;

a flyback diode poled to conduct when said solid state switch is non-conducting, having one end connected between said solid state switch and said choke, the other end of said diode connected to said other terminal to which an offset voltage can be connected;

control means to turn on and off said solid state switch in response to the voltage across said output terminals; and a power source including means for applying power to said input terminals at a voltage level higher than said predetermined regulated voltage and means for applying power to said offset voltage terminals at a voltage level lower than said predetermined regulated voltage.

5. A switching regulator as defined in claim 4 wherein said power source comprises:

a three phase transformer with a wye connected secondary;

a three phase bridge connected to said secondary of said three phase transformer to provide a DC voltage, said DC voltage is connected across said input terminals, the neutral of said secondary transformer is connected to said offset terminal connected to said diode for providing said offset voltage.

6. A switching regulator as defined in claim 4 further comprising a snubber circuit connected across said flyback diode.

* * * * *

UNITED STATES PATENT AND TRADEMARK OFFICE
CERTIFICATE OF CORRECTION

PATENT NO. : 4,258,308

DATED : March 24, 1981

INVENTOR(S) : Richard C. Weischedel

It is certified that error appears in the above—identified patent and that said Letters Patent is hereby corrected as shown below:

Insert the 2 Sheets of Drawings, as part of Letters Patent 4,258,308. See Attachment On The Title Page, "6 Claims, No Drawings" should read -- 6 Claims, 10 Drawing Figures --.

Signed and Sealed this

Twenty-fourth Day of November 1981

[SEAL]

Attest:

GERALD J. MOSSINGHOFF

Attesting Officer — Commissioner of Patents and Trademarks

VOLTAGE AT CHOKE INPUT
(CONVENTIONAL VOLTAGE
REGULATOR)

$I_C$-CHOKE CURRENT
(CONVENTIONAL V.R.)

VOLTAGE
AT CHOKE INPUT
WITH FLYBACK CONTROL $I_C$-CHOKE CURRENT
WITH FLYBACK CONTROL

INPUT POWER OF
CONVENTIONAL REGULATOR

INPUT POWER WITH
FLYBACK CONTROL

E IN RETURN CURRENT OF
CONVENTIONAL REGULATOR
WITHOUT FILTERING

E IN RETURN CURRENT
WITH
FLYBACK CONTROL